US008204462B2

(12) United States Patent
Sasaki

(10) Patent No.: US 8,204,462 B2
(45) Date of Patent: Jun. 19, 2012

(54) DIGITAL RADIO RECEIVER

(75) Inventor: Yoshio Sasaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 649 days.

(21) Appl. No.: 12/392,179

(22) Filed: Feb. 25, 2009

(65) Prior Publication Data

US 2009/0213963 A1 Aug. 27, 2009

(30) Foreign Application Priority Data

Feb. 27, 2008 (JP) ................................ P2008-046564

(51) Int. Cl.
*H04B 1/18* (2006.01)

(52) U.S. Cl. .................................................... 455/186.1

(58) Field of Classification Search .................. 455/101
See application file for complete search history.

(56) References Cited

U.S. PATENT DOCUMENTS

2004/0032805 A1* 2/2004 Schade-Buensow et al. .......................... 369/47.33

FOREIGN PATENT DOCUMENTS

| | | |
|---|---|---|
| JP | 2002 217761 | 8/2002 |
| JP | 2002 238043 | 8/2002 |
| JP | 2007 110244 | 4/2007 |
| JP | 2007 202189 | 8/2007 |
| JP | 4014968 | 9/2007 |

* cited by examiner

*Primary Examiner* — Lincoln Donovan

*Assistant Examiner* — Daniel Rojas

(74) *Attorney, Agent, or Firm* — Frommer Lawrence & Haug LLP; William S. Frommer; Russell P. Blaise

(57) ABSTRACT

A digital radio receiver for receiving information on a piece of music that is identification information for specifying content of digital acoustic information, the identification information being broadcast together with the digital acoustic information, is provided. The digital radio receiver includes an internal memory configured to store the information on the piece of music; an operation unit configured to set a timing at which a flag is attached to the information on the piece of music recorded in the internal memory; and a controller configured to perform a process for storing the information on the piece of music in the internal memory.

7 Claims, 9 Drawing Sheets

FIG. 11A

| | | | | | |
|---|---|---|---|---|---|
| 1. 12/AUG/07 | AAAAAAAA | / | BBBBBBB | / | VVVV |

FIG. 11B

| | DATE | SONG TITLE | | ARTIST | | PROGRAM |
|---|---|---|---|---|---|---|
| 1. | 12/AUG/07 | AAAAAAAA | / | BBBBBBB | / | VVVV |
| 2. | 10/AUG/07 | CCCCCCCC | / | DDDDDDD | / | VVVV |
| 3. | 20/JUL/07 | EEEEEEEE | / | FFFFFFF | / | VVVV |
| 4. | 15/JUL/07 | GGGGGGGG | / | HHHHHHH | / | VVVV |
| 5. | 15/JUL/07 | IIIIIIII | / | JJJJJJJ | / | VVVV |

DIGITAL RADIO RECEIVER

CROSS REFERENCES TO RELATED APPLICATIONS

The present invention contains subject matter related to Japanese Patent Application JP 2008-046564 filed in the Japanese Patent Office on Feb. 27, 2008, the entire contents of which are incorporated herein by reference.

BACKGROUND OF THE INVENTION

1. Field of the Invention

The present invention relates to a digital radio receiver.

2. Description of the Related Art

In recent years, digital radio broadcasting (HD-RADIO) has started in the United States. In such digital radio broadcasting, for example, programs of several tens to more than 100 channels are broadcast at the same time by using a satellite. In a digital radio receiver that receives a digital radio broadcast, similarly to a radio broadcast of the related art, it is possible to select a channel desired by a user and listen to it. Furthermore, in a satellite digital radio broadcast, program additional information is sent together with information on music data and the like. The program additional information contains, in addition to the channel number and the channel name of a program, information, such as the title of a piece of music, the artist name, a genre, and an elapsed time (the elapsed time from the beginning of a piece of music) while, for example, music is being broadcast (see, for example, Japanese Patent No. 4014968).

Furthermore, there has been proposed a digital radio receiving apparatus, in which a digital radio receiver that receives such a digital radio broadcast and a hard disk drive (HDD) are formed as one unit, the digital radio receiving apparatus being capable of recording information being received, such as music data, in addition to reception (see, for example, Japanese Unexamined Patent Application Publication No. 2007-110244).

SUMMARY OF THE INVENTION

Such a digital radio receiving apparatus having a hard disk drive has the convenience of being capable of receiving music data and the like and also recording it. When the apparatus is to be miniaturized, there are constraints on the amount of information that can be recorded. Also, when the apparatus is made to be capable of recording information freely, there is a case in which copyright may be infringed.

It is desirable to provide a compact digital radio receiver.

According to an embodiment of the present invention, there is provided a digital radio receiver for receiving information on a piece of music that is identification information for specifying content of digital acoustic information, the identification information being broadcast together with the digital acoustic information, the digital radio receiver including: an internal memory configured to store the information on the piece of music; an operation unit configured to set a timing at which a flag is attached to the information on the piece of music recorded in the internal memory; and a controller configured to perform a process for storing the information on the piece of music in the internal memory.

According to an embodiment of the present invention, it is possible to provide a compact digital radio receiver capable of obtaining desired information on a piece of music.

BRIEF DESCRIPTION OF THE DRAWINGS

FIGS. 11A and 11B show an exemplary display shown on the liquid-crystal screen provided in a display unit.

DESCRIPTION OF THE PREFERRED EMBODIMENTS

Figure 1:
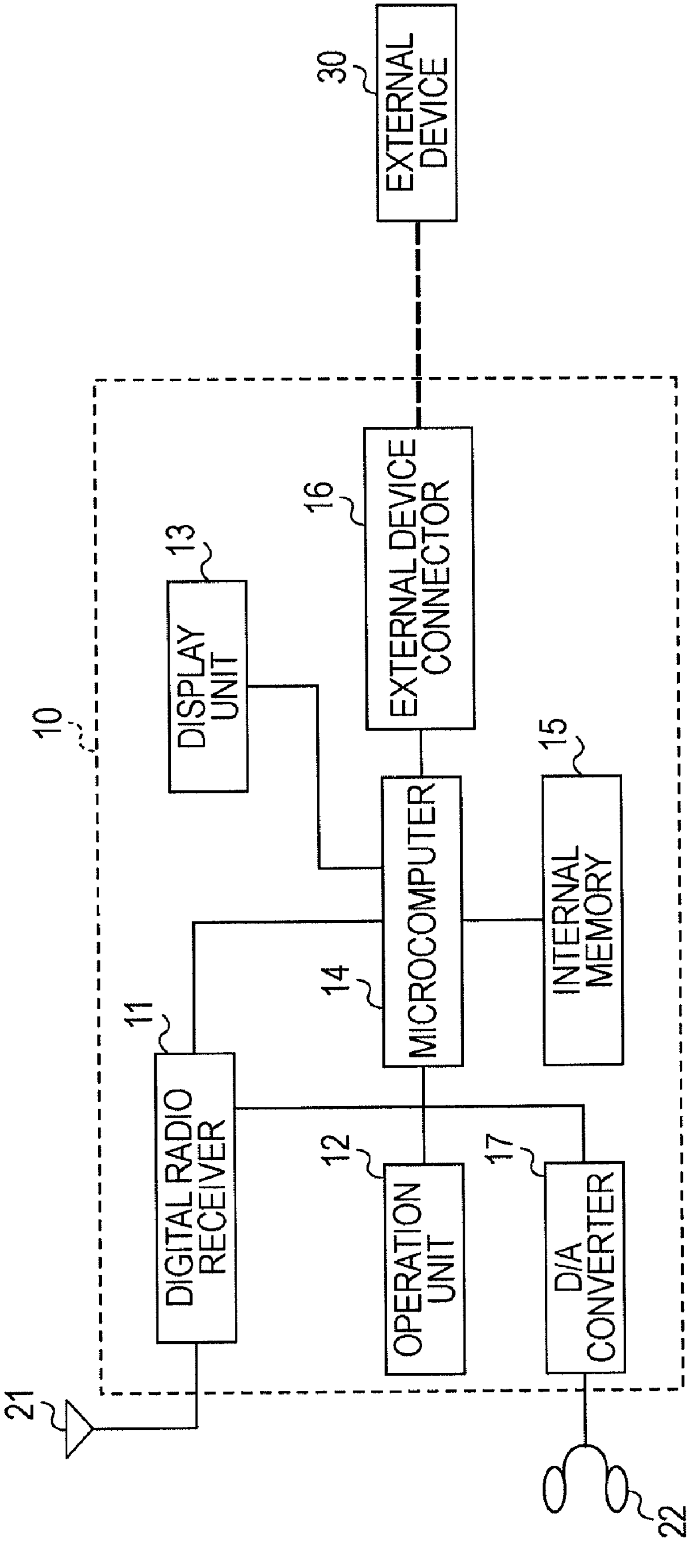
FIG. 1 is a block diagram of a digital radio receiver.

A digital radio receiver according to an embodiment of the present invention is a digital radio receiver for receiving information on pieces of music that is identification information for specifying content of digital acoustic information, the identification information being broadcast together with the digital acoustic information. The digital radio receiver includes an internal memory for storing information on pieces of music, an operation unit for setting a timing at which a flag is attached to information on a piece of music recorded in the internal memory, and a controller for performing a process for storing the information on pieces of music in the internal memory.

Here, the information on the piece of music is digital information that is attached to acoustic information and broadcast for the purpose of specifying the content of the acoustic information, and the acoustic information corresponding to the information on the piece of music is specified by only the information on the piece of music. The operation unit allows the diversified operating states of the digital radio receiver, such as a receiving frequency, a sound volume, content to be displayed on the display unit, and a decoding method, to be operated. Furthermore, by using the operation unit, a timing at which a flag is attached to information on a piece of music stored in the internal memory is set, and the setting of the timing can be performed using, for example, a button provided in the operation unit. Here, the phrase "attaching a flag" refers to writing "1" to, for example, a 1-bit flag area arranged in an area in which information on a piece of music is recorded. After the flag is attached (after "1" is written to the flag area), the controller of the digital radio receiver handles the information on the piece of music by assuming the information on the piece of music to be important, and in some of various operations for deleting piece of music data, the deletion of the information on the piece of music to which a flag is attached is prohibited.

The internal memory has a minimum of capacity sufficient to store information on a piece of music, or information on a piece of music and software which is necessary for the controller in the case that a microcomputer is provided. The internal memory may be formed by a non-volatile memory, and may also be formed by a volatile memory backed up using a battery in the case that only the information on the piece of music is to be stored in the internal memory. Furthermore, the controller may be formed by dedicated digital hardware, for example, a microcomputer (CPU), and may also be formed as a one-chip microcomputer in which a memory for storing software that causes a microcomputer to be operated is stored in the same chip.

In the digital radio receiver according to the embodiment of the present invention, with such a configuration, only the information on the piece of music having a comparatively small storage size is stored in the internal memory so that the digital radio receiver is miniaturized. Furthermore, the digital radio receiver can also be provided with a headphone so that acoustic information that is currently being broadcast, for example, music information, can be listened to in real time. Also, in this case, acoustic information itself is not stored in the digital radio receiver. As a consequence, it is not possible for the user to use acoustic information in other than the case where the acoustic information is listened to in real time. This makes it possible to protect copyright related to the acoustic information.

Then, after the information on the piece of music is obtained by such a digital radio receiver, acoustic information itself can be obtained on the basis of the information on the piece of music via an acoustic information downloading device.

Here, the acoustic information downloading device may be configured in such a manner that an ordinary personal computer is used as an acoustic information downloading device, or an acoustic information downloading device is formed as a dedicated Internet terminal. Furthermore, when information on a piece of music is to be moved from the internal memory to the acoustic information downloading device, it may be directly moved and may also be moved via an external device. The external device functions as a medium for moving information on a piece of music stored in the internal memory to the acoustic information downloading device, and has a storage medium, such as a non-volatile memory. An information communication method for moving information on a piece of music from the digital radio receiver to the acoustic information downloading device may be such that they are connected with each other in a wired manner and disconnected after the communication is completed, or may be such that information is communicated with each other by using a wireless LAN or the like. Furthermore, an information communication method for moving information on a piece of music from the digital radio receiver to an external device or from an external device to the acoustic information downloading device may be such that they are connected with each other in a wired manner and disconnected after the communication is completed, or may be such that information is communicated with each other by using a wireless LAN or the like.

Since the acoustic information is reproduced in accordance with such a procedure, if the acoustic information downloading device obtains only the information on the piece of music, it is possible to easily download the acoustic information specified by the information on the piece of music to the acoustic information downloading device. It is also possible to directly download, via the acoustic information downloading device, the acoustic information specified by the information on the piece of music to the digital radio receiver that can be carried in such a manner that the function of the external device and the function of the digital radio receiver are formed integrally. Here, since the provider of the acoustic information can charge when the downloading is to be permitted, it is possible to provide acoustic information, such as music, to the user while protecting copyright.

A description will be given below in detail, with reference to the figures, of a digital radio receiver and a method for reproducing acoustic information according to embodiments of the present invention.

FIG. 1 is a block diagram of a digital radio receiver according to an embodiment of the present invention. A digital radio receiver 10 includes a digital radio receiving unit 11, an operation unit 12, a display unit 13, a microcomputer 14 that functions as a controller, an internal memory 15, an external device connector 16, and a D/A converter 17.

The digital radio receiving unit 11 receives radio waves via an antenna 21 connected to the digital radio receiving unit 11, for example, receives a digital radio broadcast, such as HD-RADIO whose broadcast has started in the United States. It is also possible for the digital radio receiving unit 11 to receive not only acoustic information, for example, audio signals, but also data containing information regarding acoustic information. Examples of information regarding acoustic information include a music title that is being broadcast, an artist name, an album title, an ID uniquely determined for each piece of music, and Internet connection information on the provider, and these can also be received. Furthermore, there is a case in which, in place of the album title, the program title of the broadcast or furthermore, in a wider sense, program information for specifying a program, are broadcast. These items of information on the acoustic information are also called information on a piece of music (piece of music data) and are information for specifying acoustic information. Furthermore, there is a case in which, in addition to information on a piece of music, information on the name of the broadcast station, the broadcast frequency, and information regarding other broadcasts are broadcast. Since such information is information that specifies a broadcast, it is called broadcast information. The content of the information on the piece of music and the broadcast information may partially overlap with each other, for example, a part of the program information is contained in both of the information. Furthermore, a combination of the information on the piece of music and the broadcast information is called associated information.

The digital radio receiving unit 11 includes a front end for allowing necessary radio waves among the radio waves received by the antenna to reach an appropriate level, a demodulator for demodulating a signal (for example, an ODFM signal) from the front end, and a decoding unit for decoding a signal from the demodulator. The decoding unit decodes the compressed acoustic information, and also decodes additional information (information on a piece of music, program information, etc), and outputs the result to the microcomputer 14. The communication line with the microcomputer 14 is often formed in such a manner that a signal for controlling the digital radio receiving unit 11 is communicated from the microcomputer 14.

The operation unit 12 is a unit used to operate the digital radio receiver 10 and functions as a man/machine interface. For example, it is possible, using the operation unit 12, to change a radio receiving station to be received and operate the sound volume. By pressing a recording button arranged in the operation unit when the user is fond of the music being broadcast, it is possible to store the information regarding a piece of music in the internal memory.

The display unit 13 is a display device for displaying the state of the digital radio receiver 10, received data, and the like, and is formed as, for example, a liquid-crystal display device. On the liquid-crystal display device, information regarding a piece of music (for example, the title of a piece of music, an artist name, an album title (or program information), an ID uniquely determined for each piece of music, Internet connection information on the provider, etc.), broadcast information (for example, the name of a broadcast station, a broadcast frequency, information regarding other broadcasts), and part or whole of associated information containing both the music information and the broadcast information can be displayed. In addition, the states of the digital radio receiver 10, for example, the sound volume setting, the sound quality setting, and the like can be displayed.

The microcomputer 14 functions as a control unit for controlling the digital radio receiver 10. The microcomputer 14 receives a signal from the operation unit 12, controls the internal memory 15, performs display on the display unit 13, and sends data to the external device connector 16. Furthermore, the additional information decoded by the digital radio receiving unit 11 is also received and processed by the microcomputer 14.

The internal memory 15 is used to store information associated with a received piece of music. Furthermore, the internal memory 15 also functions as an auxiliary storage device for the microcomputer and has stored therein programs necessary to operate the digital radio receiver 10. There is a case in which the functions of the auxiliary storage device are incorporated in the microcomputer, and these are combined to be formed as a one-chip microcomputer.

The external device connector 16 is a connector for connecting an external device 30 to the digital radio receiver 10 when information is to be moved. As the external device 30, various forms are possible, as long as at least information regarding a piece of music can be recorded. The external device 30 will be described in more detail later.

The D/A converter 17 is used to convert digital acoustic information decoded by the digital radio receiving unit 11 into analog acoustic information, and supplies it to a headphone 22. In the digital radio receiver 10 according to the present embodiment, the D/A converter 17 and the headphone 22 are provided so that a user can listen to acoustic information which can then be stored in the internal memory 15 at the time of listening if so desired. Therefore, these are not necessary in the case that necessary information associated acoustic information is to be stored in the internal memory 15 without the user listening to the acoustic information at the time of broadcast. In the case that the D/A converter 17 and the headphone 22 are provided, it is possible to store in the internal memory 15 necessary information based on this acoustic information. Furthermore, in the case that the D/A converter 17 and the headphone 22 are not provided, it is possible to store in the internal memory 15 necessary information based on the information on the piece of music displayed on the liquid-crystal display of the display unit 13.

Figure 2:
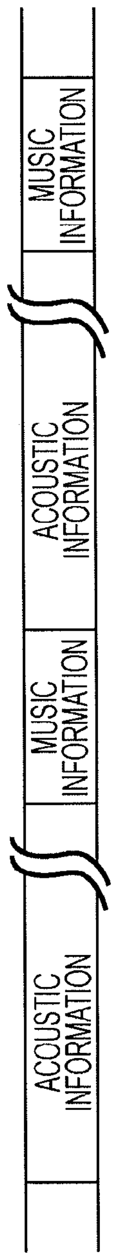
FIG. 2 shows the arrangement of acoustic information and information on a piece of music in a time-series manner.

FIG. 2 shows how acoustic information and information regarding a piece of music are received in time series by using radio waves as a medium. It is common practice that information on a piece of music is inserted during the time in which acoustic information is being received, and the acoustic information is received for a longer time. When broadcast information is to be transmitted, broadcast information is transmitted in conjunction with the information regarding a piece of music. That is, the acoustic information and the information regarding a piece of music are broadcast on a time-division basis.

Figure 3A:
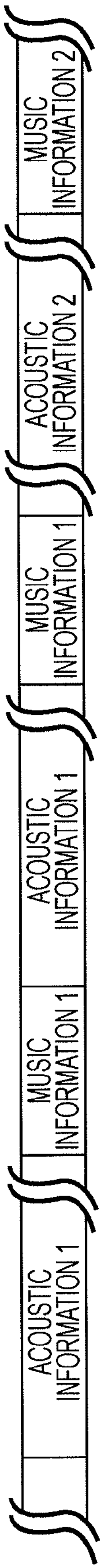
FIGS. 3A and 3B illustrate in more detail the relationship between acoustic information and information on pieces of music shown in FIG. 2.
Figure 3B:
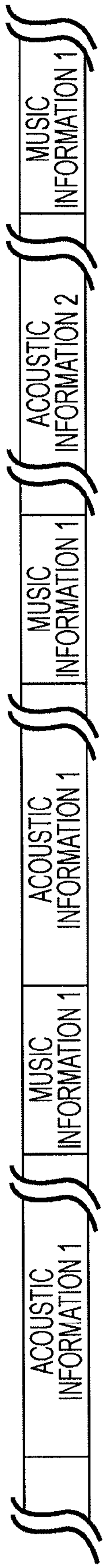

FIGS. 3A and 3B illustrate in more detail the relationship between acoustic information and information on a piece of music, which are shown in FIG. 2. FIG. 3A shows the relationship between desirable acoustic information and information on a piece of music, and FIG. 3B shows the relationship between actual acoustic information and information on a piece of music. In the relationship between desirable acoustic information and information on a piece of music, the acoustic information and the information on the piece of music typically make a one-to-one correspondence with each other, and the information on the piece of music arranged adjacent to the acoustic information (either immediately before or immediately after acoustic information, which is determined in advance) necessarily corresponds to the acoustic information. However, the acoustic information and the information on the piece of music are not simultaneously generated, and information generated at another time is combined later. Therefore, it is considerably difficult to cause the relationship to be completely synchronized as time-series information. As a result, a case can occur in which acoustic information and information on a piece of music are arranged in a time series manner without correlation as shown in FIG. 3B rather than in an ideal state shown in FIG. 3A.

A description will be given more specifically with reference to FIG. 3B. It is assumed here that, for example, acoustic information 1 is a musical piece by the performance of a first musician, information on a piece of music 1 is information on a piece of music associated with the acoustic information 1. Acoustic information 2 is a musical piece by the performance of a second musician, and information on a piece of music 2 is information on a piece of music associated with the acoustic information 2. In this case, it often involves difficulty in attaching acoustic information 1 to the acoustic information 1 in an ex-post manner in an ideal state as shown in FIG. 3A. The reason for this is that, in the case of a live performance, information on a piece of music serving as additional information is often attached while a broadcast is performed, and in this case, there is no time-related margin for making synchronization for them, and, for example, a time offset of approximately 10 seconds may occur.

When a broadcast is transmitted as a time series shown in FIG. 3B, in the case that the broadcast is decoded, the information on the piece of music is supplemented while the acoustic information is reproduced and listened to, and the information on the piece of music is stored, there is a risk that the user may obtain information on a piece of music that does not correspond to the acoustic information.

In another example, in the case that so-called fade-in or fade-out effects are to be exhibited, two items of acoustic information are mixed and reproduced. As a consequence, a case can occur in which even if information on a piece of music corresponding to desired acoustic information wants to be obtained, incorrect information on a piece of music is obtained, and a chance of obtaining information on a desired piece of music is missed. Furthermore, in the case that the above-described time offset between the acoustic information and the information on the piece of music, and the above-described fade-in effect and fade-out effect are involved, a case in which the acoustic information and the information on the piece of music do not match with each other over three or more items of information can easily occur. Specific embodiments for avoiding the above-described situations will be described below.

First Embodiment

Figure 4:
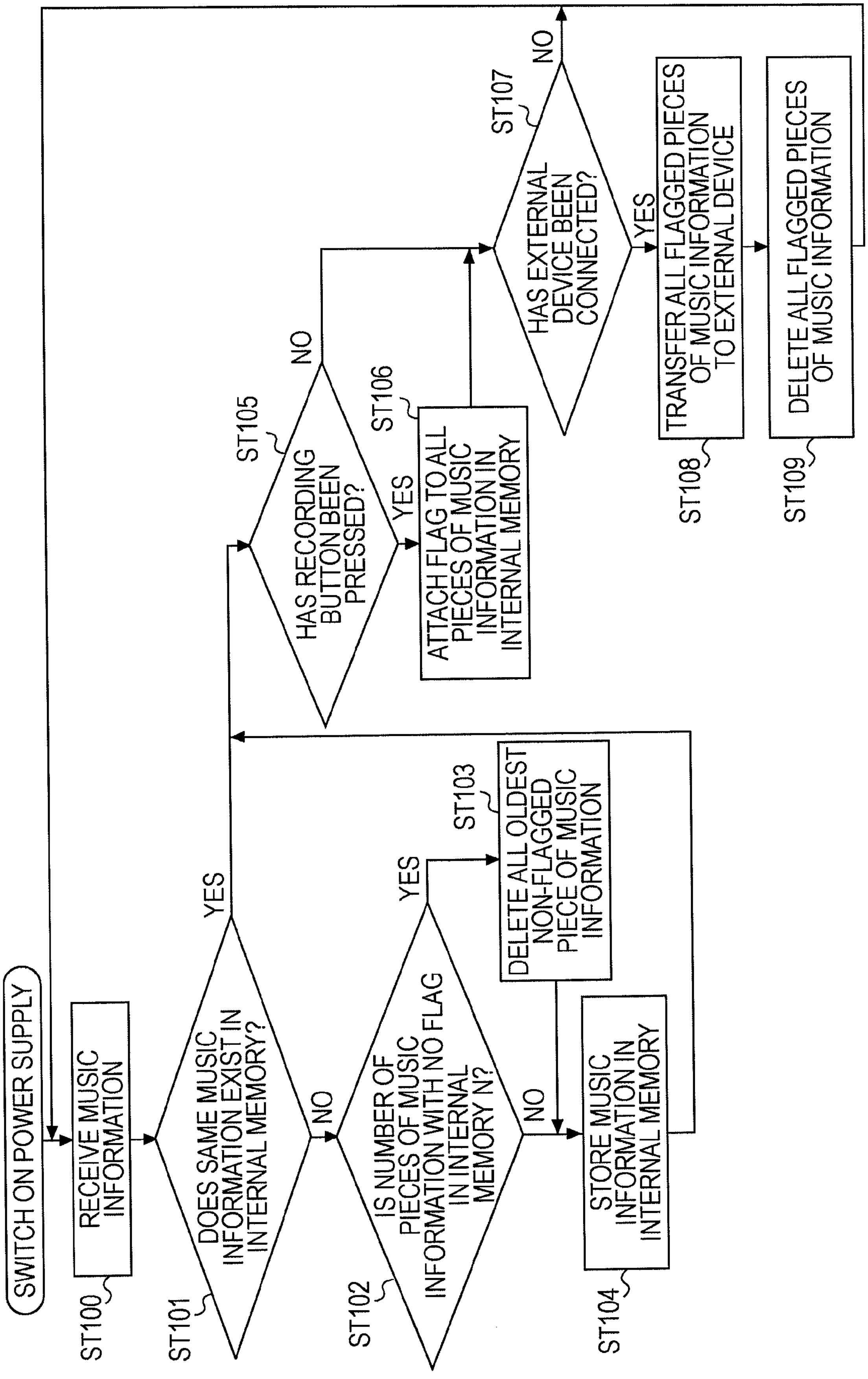
FIG. 4 is a flowchart showing the operation of the digital radio receiver.

FIG. 4 is a flowchart of a first embodiment, which specifically shows how the digital radio receiver 10 operates and information on a desired piece of music is obtained. A description of this flowchart will be given with emphasis on processing performed by the microcomputer 14.

After the power supply is switched on, in step ST100, information on a piece of music associated with a piece of music that is currently being broadcast is received. More specifically, after the information on the piece of music is received by the digital radio receiving unit 11, the microcomputer 14 decodes the information on the piece of music (for example, the piece of music title, an artist name, the ID of a piece of music, Internet connection information on the provider, etc.). Then, each time the information on the piece of music is updated, the process proceeds to step ST101.

In step ST101, it is determined whether or not the same information on the piece of music exists in the internal memory 15. The reason for this is that if the information on the piece of music that has already been stored in the internal memory 15 is stored a plurality of times in a duplicated manner, the storage capacity is consumed uselessly.

When the determination result is negative (No) in step ST101, the process proceeds to step ST102, and when the determination result is affirmative (Yes), the process proceeds to step ST105.

In step ST102, it is determined whether or not the number of pieces of information on stored non-flagged pieces of music (information on pieces of music in which "0" is written to the flag) among the pieces of information on pieces of music stored in the internal memory 15 is N. Here, N is the maximum number of pieces of information on non-flagged pieces of music, which can be stored in the internal memory 15, and this number can be set from the operation unit 13. Furthermore, by operating the operation unit 13, in addition to the maximum recordable number of pieces of information on non-flagged pieces of music, the maximum recordable number of pieces of music in which information on the non-flagged piece of music and information on the flagged piece of music (information on the piece of music in which "1" is written to the flag) are combined can be set to an appropriate number M.

Figure 5:
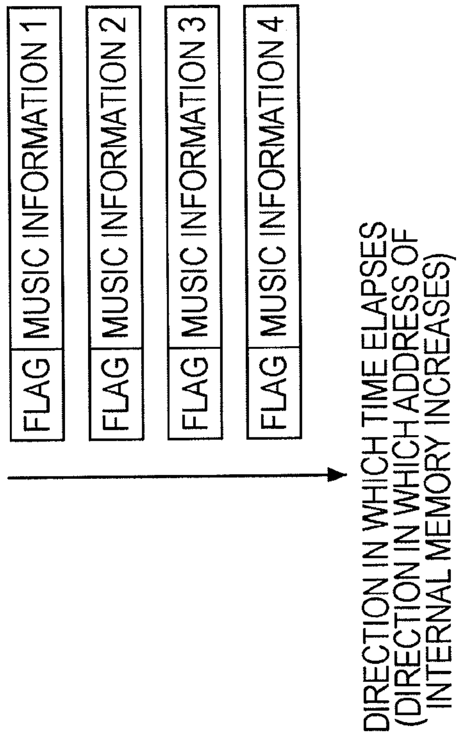
FIG. 5 is a conceptual view illustrating flags.

FIG. 5 is a conceptual view illustrating flags. A description will be given of flags. When a user determines whether or not information regarding pieces of music that are sequentially stored in the internal memory 15 is useful for the user and determines that it is useful, the flag (flag bit) of each piece of information regarding a piece of music of the internal memory 15 is set to "1", and is written with "0" when it is determined that the information on the piece of music is not useful. Alternatively, when the usefulness is undetermined, the flag of information on each piece of music of the internal memory 15 is maintained at "0" indicating a default status. In the internal memory 15, the earlier in relation to time the information on the piece of music is stored in the internal memory 15, it is stored in the memory specified using a smaller address value.

That is, in step ST102, it is determined whether or not the number of memories in which the value of the flag is "0" among the pieces of information on pieces of music stored in the internal memory 15 is N. Here, N is a positive integer, and the size of N is a value that is determined in advance by the user. By setting the value of N to a predetermined value, an upper limit is determined for the number of necessary internal memories 15, thereby preventing an increase in the capacity of the internal memory 15 being unnecessarily used.

The case in which the determination result in step ST102 is No is a case in which the recordable capacity still remains in the internal memory 15, and the process proceeds to step ST104. On the other hand, the case in which the determination result in step ST102 is Yes is a case in which the recordable capacity does not remain in the internal memory 15 for the information on non-flagged pieces of music, and the process proceeds to step ST103.

In step ST103, the information on the oldest non-flagged piece of music (the value of the flag is "0") among the pieces of information on pieces of music stored in the internal memory 15 is deleted.

Here, the phrase "the information on the oldest piece of music" means the information on the piece of music stored at the earliest time, and this means that the address value of the internal memory 15 is smallest. For example, in FIG. 5, if the flag of the information on the piece of music 1 stored at the smallest address value is "0", the information on the piece of music 1 is deleted. Then, the addresses of the internal memory 15 are packed closely, information on the piece of music 2 is instead stored at the place where the information on the piece of music 1 had been stored, and information on the piece of music 3 is instead stored at the place where the information on the piece of music 2 had been stored. Similarly, the contents (the pieces of information on pieces of music) of the memory are sequentially moved. The information on the piece of music stored in the memory specified by the N-th address from the beginning is rewritten with the information on the piece of music stored in the memory specified by the (N−1)th address. Here, in summary, the above-described process for rewriting the content of the memory is an example of a process for making it possible to specify the information on the oldest non-flagged piece of music among the pieces of information on pieces of music. Another process may be used as long as this object is achieved, for example, a process for rewriting a pointer may be used.

In step ST104, the information on the piece of music is stored in the internal memory 15.

That is, when it is determined in step ST102 that there is an available capacity in the internal memory 15, the most recent information on the piece of music is stored in the memory specified by the address next to the address corresponding to the memory having content already stored therein. In step ST103, when the content of the memory specified by the N-th address is deleted, the most recent information on the piece of music is stored in the memory specified by the N-th address. Thereafter, the process proceeds to step ST105. Here, the address that specifies the memory to be deleted may differ from the above-described address in correspondence with the above-described process for rewriting the content of the memory. In summary, since the process in step ST104 is a process for allocating a free area and storing information regarding a piece of music, specific content of processing is not limited to this as long as this object can be achieved.

In step ST105, it is determined whether or not the recording button of the operation unit 12 has been pressed. Here, the recording button is a button for, when pressed, sending, to the microcomputer 14, a signal with which a timing at which the flag of the information on the piece of music recorded in the internal memory 15 is set to "1" is supplied. When the determination result in step ST105 is Yes, the process proceeds to step ST106, and when the determination result is No, the process proceeds to step ST107.

In step ST106, all the pieces of information on pieces of music in the internal memory 15 are flagged (the value of the flag is set to "1"). Thereafter, the process proceeds to step ST107.

In step ST107, it is determined whether or not the external device 30 has been connected. The determination of whether or not the external device 30 has been connected can be performed by various techniques. For example, a command for confirming the connection may be sent to the external device 30, and it may be detected whether or not a response therefor is returned from the external device 30. For example, a push switch may be provided in the vicinity of the external device connector 16, so that the pressing of the push switch by the external device 30 makes it possible to confirm that the external device 30 has been connected.

When the determination result in step ST107 is Yes, the process proceeds to step ST108, and when the determination result is No, the process proceeds to step ST100. This is because when the external device 30 has been connected, the information on the piece of music can be directly sent to the external device 30. However, when the external device 30 has not been connected, it is difficult to transfer the information on the piece of music. Therefore, it is necessary to maintain the music information to be stored until the external device 30 is connected to the internal memory 15.

In step ST108, the information on all the flagged pieces of music (information on the pieces of music in which the flag of the internal memory 15 is "1") are transferred to the external device 30. After the processing in step ST108 is completed, the process proceeds to step ST109.

In step ST109, the information on all the flagged pieces of music (information on the pieces of music in which the flag of the internal memory 15 is "1") are deleted. The reason for this is that since the information on the piece of music in which the flag is "1" has already been transferred to the external device 30, there is no meaning for the storage in the internal memory 15, and a free capacity is allocated so that information on new pieces of music can be stored in the internal memory 15. The operation of the deletion is to perform an operation for finding the beginning address among the addresses, at which the stored content (the information on the piece of music) has been deleted this time, and packing closely the information on pieces of music stored at the subsequent addresses in sequence at the address at which the information on the piece of music has been deleted this time. This is equivalent to the case that the information on the piece of music in which the flag is set to "0" does not exist, substantially, all the stored content of the internal memory 15 is nullified, and storage from the beginning address of the internal memory 15 is made possible again. The specific processing in step ST109 is not limited to the above-described specific processing, and any processing may be used as long as it is a process equivalent to a process for deleting information on all the flagged pieces of music of the internal memory 15.

When it is determined in step ST107 that the external device 30 has been connected, the microcomputer 14 can perform transmission and reception of information (verifying operation) with the external device 30 as necessary, so that a special display for confirming that the recording button has been pressed and the information on the piece of music in which the flag is "1" has been transferred, for example, a display such that a check mark is attached to the screen of the liquid-crystal display of the display unit 13 or a display such that the color of the screen of the liquid-crystal display is changed, can be performed.

Figure 6A:
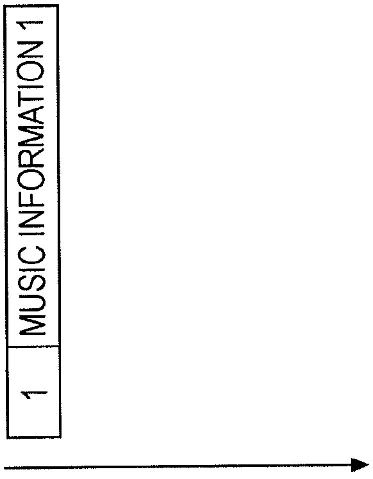
FIGS. 6A 6B, and 6C show an example of flags and the number of pieces of information on pieces of music in which the flag is set to "1"
Figure 6B:
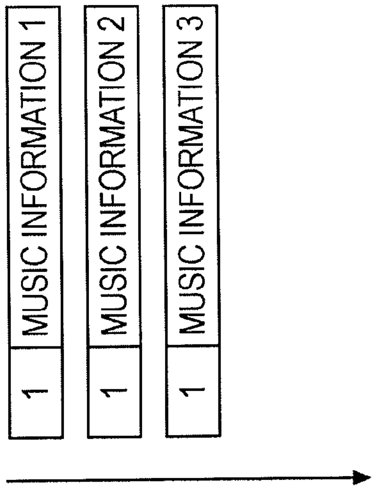
Figure 6C:
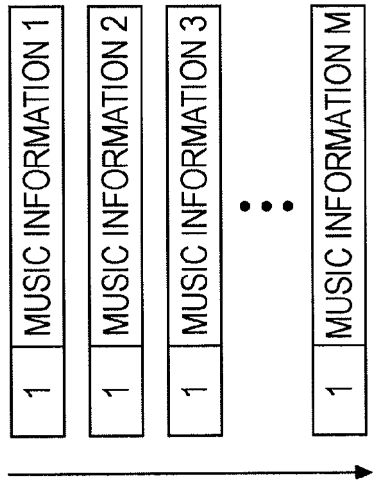

In step ST107, the number of pieces of information on pieces of music to be transferred is from 1 to M, and FIGS. 6A 6B, and 6C show an example of flags and the number of pieces of information on pieces of music in which the flag is set to "1". For example, as shown in FIG. 6A, when the number of pieces of information on pieces of music in which the flag is set to "1" is 1, the number of pieces of information on pieces of music to be transferred is 1. As shown in FIG. 6B, when the number of pieces of information on pieces of music in which the flag is set to "1" is 3, the number of pieces of information on pieces of music "1" to be transferred is 3. As shown in FIG. 6C, when the number of pieces of information on pieces of music in which the flag is set to "1" is M, the number of pieces of information on pieces of music to be transferred is M. Here, it is a condition that the flag of the information on the piece of music to be transferred is "1". Therefore, when a maximum of pieces of information on N non-flagged pieces of music are made to be information on flagged pieces of music by the stage of the final process, M includes N. Information regarding a non-flagged piece of music may be corrected to information regarding a flagged piece of music, or information regarding a flagged piece of music may be corrected to information regarding a non-flagged piece of music by the operation using the operation unit 12.

In the above-described embodiment, a flag "1" is attached to the information on the piece of music to be transferred. Alternatively, a buffer area for transferring information on pieces of music to the external device 30 without attaching a flag "1" may be provided in the internal memory 15, so that all the information on pieces of music corresponding to the flag "1" are temporarily stored in the buffer area. All the information on pieces of music stored in the buffer area may be transferred to the external device 30 at an appropriate timing after the external device 30 is connected.

Second Embodiment

Figure 7:
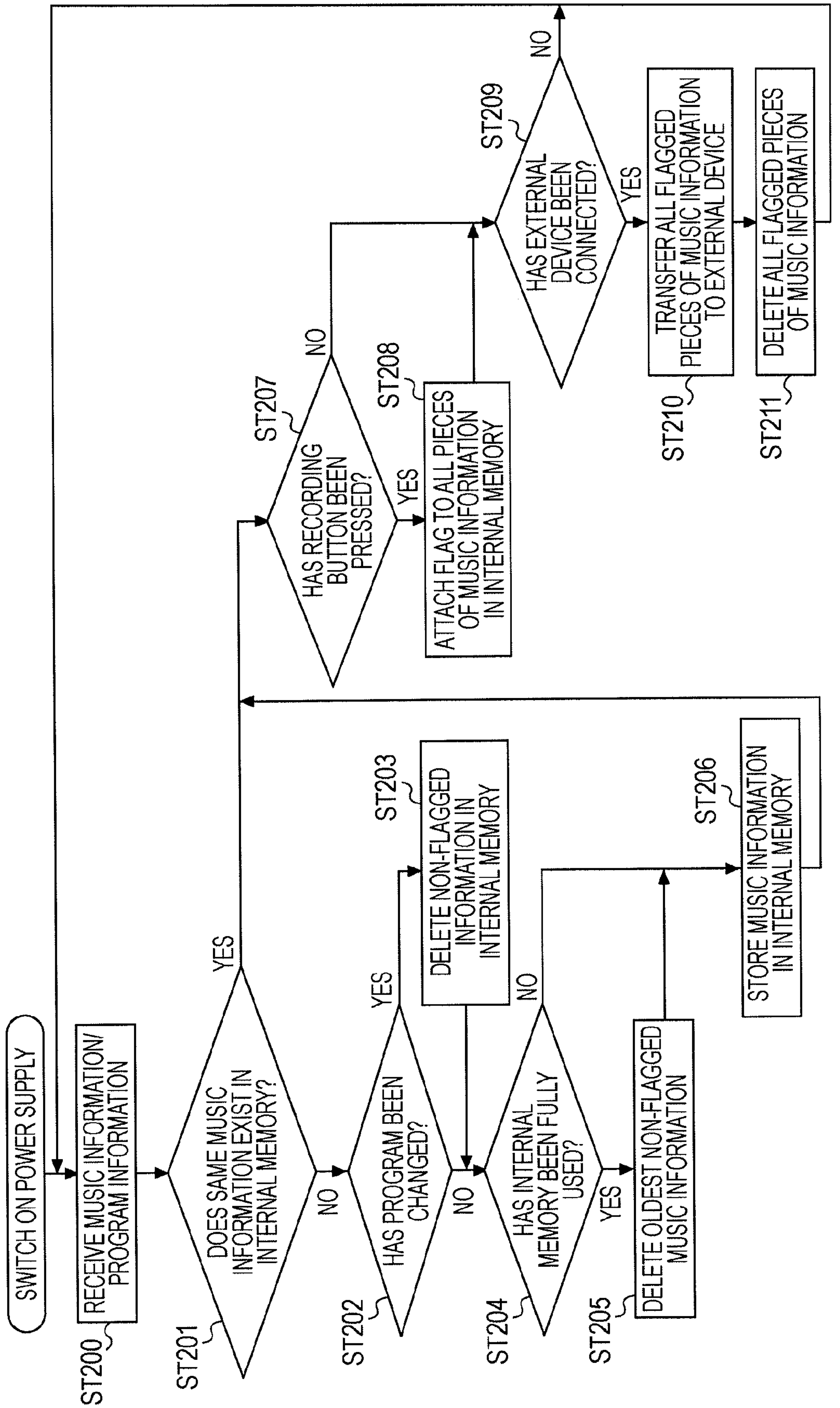
FIG. 7 is another flowchart showing the operation of a digital radio receiver.

A second embodiment of the present invention will be described below with reference to the flowchart shown in FIG. 7. The processing from step ST207 to step ST211 in the second embodiment is identical to the processing from step ST105 to step ST109 in the first embodiment, and accordingly, the processing of this part will be given briefly.

After the power supply is switched on, in step ST200, information on a piece of music and program information associated with the piece of music (music) that is currently being broadcast are received. More specifically, after these are received by the digital radio receiving unit 11, the information on the piece of music (for example, a music title, an artist name, a music ID, Internet connection information on the provider, etc.) is decoded by the microcomputer 14. Furthermore, the program information is similarly decoded by the microcomputer 14. Here, the program information, similarly to the information on the piece of music, is information transmitted together with acoustic information from the broadcast station. The content of the program information includes at least a program title (for example, "this week's hit chart", etc.). The program information may further include a program providing sponsor name, the name of the master of ceremony of the program, and a message such as program editing guidelines. Then, each time the information on the piece of music is updated, the process proceeds to step ST201.

In step ST201, it is determined whether or not the same information on the piece of music exists in the internal memory 15. The reason for this is that if the information on the piece of music that has already been stored in the internal memory 15 is stored a plurality of times in a duplicated manner, the storage capacity is consumed uselessly. When the determination result is No, the process proceeds to step ST202, and when the determination result is Yes, the process proceeds to step ST207.

In step ST202, it is determined whether or not the content of the program has been changed on the basis of the result in which the program information has been decoded.

When the determination result in step ST202 is Yes, the process proceeds to step ST203, and when the determination result in step ST202 is No, the process proceeds to step ST204.

In step ST203, all the pieces of non-flagged information (information in which the flag is "0") in the internal memory 15 is deleted. The processing in step ST203, when viewed reversely, is processing in which flagged information (information in which the flag is set to "1") in the internal memory 15 is not deleted. That is, all the information on pieces of music in which the flag is "0" among the information on pieces of music on the programs, which have been stored until then, are deleted, the stored content at the freed address is sequentially replaced with the information on the piece of music at an address having a larger address number, and the information on the piece of music is stored in the memory of the internal memory 15 in sequence starting from the beginning address. As a result, the information on the piece of music on programs in which the user is not interested can be deleted and the available capacity of the internal memory 15 can be increased. Thereafter, the process proceeds to step ST204.

In step ST204, it is determined whether or not the internal memory 15 has been fully used. Here, "the internal memory 15 being fully used" refers to that information on pieces of music have been stored in all the storage capacity of the internal memory 15, which is determined in advance. Then, when the determination result in step ST204 is Yes, the process proceeds to step ST205, and when the determination result in step ST204 is No, the process proceeds to step ST206.

In step ST205, the information on the oldest non-flagged (the flag is "0") piece of music among the information on pieces of music stored in the internal memory 15 is deleted. Here, since the information on the oldest non-flagged piece of music is stored content at the address at which the information on the piece of music in which the flag of the information on the piece of music positioned at the beginning position among the addresses of the internal memory 15 is "0" is stored, the information on the piece of music can easily be specified. Furthermore, after the information on the oldest non-flagged piece of music is deleted, the information on the piece of music stored at the address next to the address at which the information on the oldest non-flagged piece of music has been stored is replaced. In the manner described above, the information on pieces of music are sequentially rearranged, and the address of the last number among the plurality of addresses, which are allocated as the storage area of the information on pieces of music, is nullified.

In step ST206, the information on the piece of music obtained in step ST200 is stored at the address next to the last stored address of the internal memory 15. When step ST206 is reached after passing through step ST205, the information on the piece of music obtained in step ST200 is stored at the address of the last number. Then, the process proceeds to step ST207.

In step ST207, it is determined whether or not the recording button of the operation unit 12 has been pressed. When the determination result in step ST207 is Yes, the process proceeds to step ST208, and when the determination result is No, the process proceeds to step ST209.

In step ST208, all the information on pieces of music in the internal memory 15 are flagged (the value of the flag is set to "1"). Thereafter, the process proceeds to step ST209.

In step ST209, it is determined whether or not the external device 30 has been connected. When the determination result in step ST209 is Yes, the process proceeds to step ST210, and when the determination result is No, the process proceeds to step ST200.

In step ST210, information on all the flagged pieces of music (information on the pieces of music in which the flag is "1") of the internal memory 15 are transferred to the external device 30. After the processing in step ST210 is completed, the process proceeds to step ST211.

In step ST211, information on all the flagged pieces of music (the information on pieces of music in which the flag is "1") of the internal memory 15 is deleted.

In the above-described embodiment, a flag "1" is attached to the information on pieces of music to be transferred. In addition, a buffer area for transferring, without attaching a flag "1" similarly to the modification of the first embodiment, information on a piece of music to the external device 30 may be provided in the internal memory 15. All the information on pieces of music corresponding to the flag "1" may be temporarily stored in the buffer area, so that all the information on pieces of music stored in the buffer area are transferred to the external device 30 at an appropriate timing after the external device 30 is connected.

Third Embodiment

Figure 8:
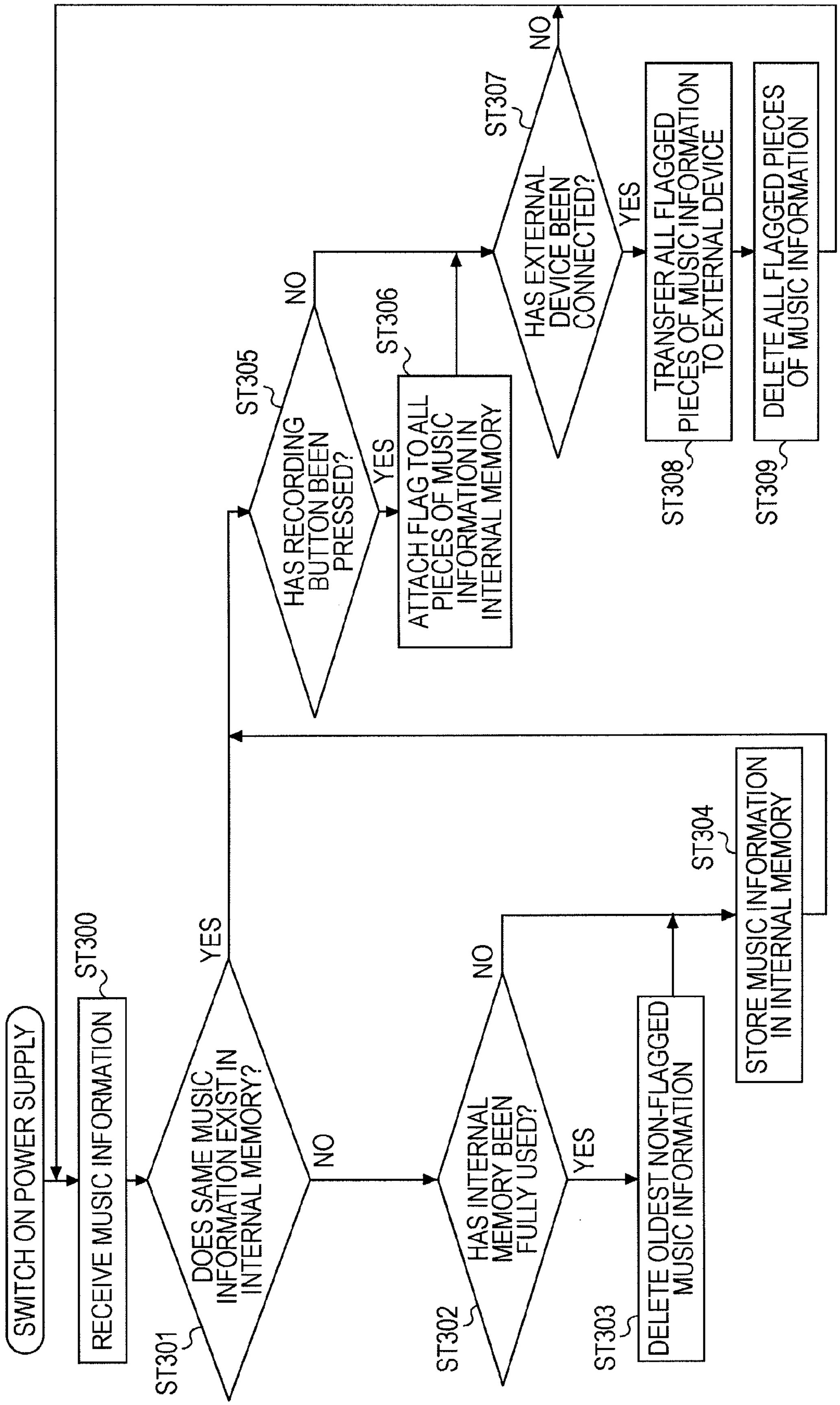
FIG. 8 is still another flowchart showing the operation of a digital radio receiver.

A third embodiment of the present invention will be described below with reference to the flowchart shown in FIG. 8. The processing from step ST305 to step ST309 in the third embodiment is identical to the processing from step ST105 to step ST109 in the first embodiment, and accordingly, the processing of this part will be described briefly.

After the power supply is switched on, in step ST300, information on a piece of music associated with the piece of music (music) that is currently being broadcast is received. More specifically, after the information on pieces of music is received by the digital radio receiving unit 11, the microcomputer 14 decodes the information on the piece of music (for example, a music title, an artist name, a music ID, Internet connection information on the provider, etc.). Then, each time the information on the piece of music is updated, the process proceeds to step ST301.

In step ST301, it is determined whether or not the same information on the piece of music exists in the internal memory 15. When the determination result is No, the process proceeds to step ST302, and when the determination result is Yes, the process proceeds to step ST305.

In step ST302, it is determined whether or not the internal memory 15 has been fully used. Then, when the determination result in step ST302 is Yes, the process proceeds to step ST303, and when the determination result in step ST302 is No, the process proceeds to step ST304.

In step ST303, the information on the oldest non-flagged piece of music (the flag is "0") among the pieces of information on pieces of music stored in the internal memory 15 is deleted. Here, since the information on the oldest non-flagged piece of music is the stored content at the address at which the information on the piece of music whose flag of the information on the piece of music positioned at the beginning among the addresses of the internal memory 15 is "0" is stored, it can easily be specified. After the information on the oldest non-flagged piece of music is deleted, the information on the piece of music stored at the address next to the address at which the information on the oldest non-flagged piece of music has been stored is replaced. In the manner described above, the information on the information on pieces of music is sequentially rearranged, and the address of the last number among a plurality of addresses as a storage area for the information on the piece of music is nullified.

In step ST304, the information on the piece of music obtained in step ST300 is stored at the address next to the last stored address of the internal memory 15. When step ST304 is reached after passing through step ST303, the information on the piece of music obtained in step ST300 is stored at the address of the last number. Then, the process proceeds to step ST305.

In step ST305, it is determined whether or not the recording button of the operation unit 12 has been pressed. When the determination result in step ST305 is Yes, the process proceeds to step ST306, and when the determination result is No, the process proceeds to step ST307.

In step ST306, a flag is attached to all the pieces of information on pieces of music in the internal memory 15 (the value of the flag is set to "1"). Thereafter, the process proceeds to step ST307.

In step ST307, it is determined whether or not the external device 30 has been connected. When the determination result in step ST307 is Yes, the process proceeds to step ST308, and when the determination result is No, the process proceeds to step ST300.

In step ST308, the information on all the flagged pieces of music of the internal memory 15 (the information on pieces of music in which the flag is "1") is transferred to the external device 30. After the processing in step ST308 is completed, the process proceeds to step ST309.

In step ST309, the information on all the flagged pieces of music (the information on pieces of music in which the flag is "1") of the internal memory 15 is deleted.

In the above-described embodiment, the flag "1" is attached to the information on the piece of music to be transferred. A buffer area for transferring, without attaching the flag "1" in the same manner as in the modification of the first embodiment, information on a piece of music to the external device 30 may be provided in the internal memory 15, and the information on all the pieces of music corresponding to the flag "1" may be temporarily stored in the buffer area, so that the information on all the pieces of music stored in the buffer area are transferred to the external device 30 at an appropriate timing after the external device 30 is connected.

In the first embodiment, it is determined in step ST102 whether or not the number of pieces of information on non-flagged pieces of music is N. The value of the number N in this case may be set as appropriate by the user. Furthermore, the capacity in the full state in the determination of whether the internal memory has been fully used (the state in which all the storage-capable capacity has been fully used) in step ST204 of the second embodiment and in step ST302 of the third embodiment may be determined as appropriate by the user. In this case, the setting of the capacity can be performed by the user by operating the operation unit 12.

The external device 30 will be described below. Various forms of the external device 30 are possible. By considering portability, the external device 30 can be miniaturized as a non-volatile storage device having only the function (memory function) of storing only the information on pieces of music for the purpose of simply recording information on pieces of music.

Figure 9:
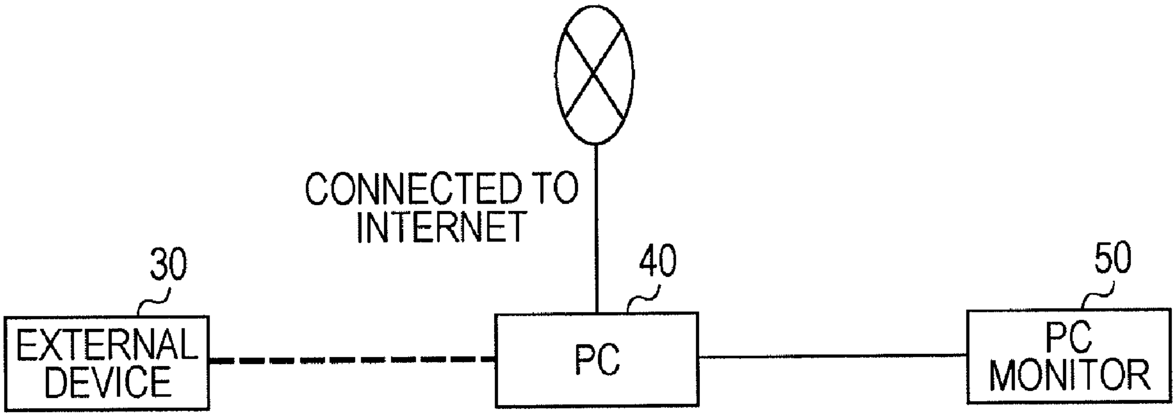
FIG. 9 illustrates a method of reproducing acoustic information.

FIG. 9 illustrates a method of reproducing acoustic information in the embodiment, that is, how information on a piece of music obtained by the digital radio receiver 10 is used. The external device 30 (also described in FIG. 1), a personal computer (PC) 40, and a PC monitor 50, which are shown in FIG. 9, constitute an acoustic information downloading device. A description will be given below, with reference to FIG. 9, of how information on a piece of music stored in the external device 30 is used.

The personal computer 40 is connected to the Internet. The PC monitor 50 formed of a liquid-crystal display or the like is connected to the personal computer 40. The external device 30 can be loaded to and unloaded from the personal computer 40 via an external device interface. The personal computer 40 and the PC monitor 50 may also be an acoustic information downloading device formed in such a manner as to be one unit.

When the external device 30 is inserted into the external device interface of the personal computer 40, the personal computer 40 detects that the external device 30 has been inserted, starts an acoustic information downloading program, or starts an acoustic information downloading program by a manual operation, and downloads digital acoustic information specified by the information on the piece of music to the personal computer 40 in accordance with a predetermined procedure. This digital acoustic information is, in principle, the same as the digital acoustic information that is broadcast and such that information on a piece of music is obtained by the digital radio receiver 10. In the case that the external device has been configured as a portable information recording and reproduction terminal device, the portable information recording and reproduction terminal device downloads acoustic information via the personal computer 40.

Downloading is specifically performed, for example, in accordance with the following procedure. Information on a list of pieces of music stored in the external device 30 is displayed on the PC monitor 50. The user specifies a target to be downloaded by putting a check mark in only the information on the piece of music corresponding to the acoustic information desired to be downloaded by the user himself/herself among the pieces of information on pieces of music. Thereafter, a display (soft switch) that permits the transmission of these items of information to the server of the corresponding acoustic information provider via the Internet is clicked.

The personal computer 40 makes connection with a predetermined connection destination, that is, the acoustic information provider, on the basis of the address of the Internet connection destination, which is contained in the information on the piece of music or the associated information, and makes a request for downloading the corresponding acoustic information. In response, when the acoustic information provider (the server of the acoustic information provider) charges the user on the basis of the copyright, the acoustic information provider sends back the fee thereof, the method of withdrawing the corresponding acoustic information, and the like to the personal computer 40. At this time, the name of the broadcast station received by the user and the date and time of the reception are contained in the associated information, and the name of the broadcast station received by the user, the date and time of the reception, and further the program title are stored in the server of the acoustic information provider, so that these items of information can be used by the acoustic information provider for the purpose of a market research.

In the case that the user approves the charging, a soft switch displayed on the PC monitor 50, which is used to notify the acoustic information provider of the approval, is clicked, thereby starting the downloading of the acoustic information in the storage device of the personal computer 40. In the case that the external device is configured as a portable information recording and reproduction terminal device, acoustic information may also be directly downloaded to the portable information recording and reproduction terminal device via the personal computer 40.

In the manner described above, the user stores information on a piece of music in which a broadcast is received by the digital radio receiver 10 in the internal memory 15 by pressing the recording button at a desired timing of the user, and moves the information on the piece of music stored in the internal memory 15 to the personal computer (PC) 40 that functions as an acoustic information downloading device. On the basis of the Internet connection information for making connection through the Internet with the provider of the digital acoustic information contained in the information on the piece of music, the personal computer 40 communicates with the server of the provider of the digital acoustic information via the Internet line, making it possible to download digital acoustic information specified using information on a piece of music from the server.

Furthermore, it is possible for the user to reproduce the acoustic information downloaded to the personal computer 40 by using an audio device connected to the personal computer 40 and enjoy it. Furthermore, after the acoustic information is downloaded to the connected portable information recording and reproduction terminal device from the personal computer 40, it is possible to reproduce the acoustic information using the portable information recording and reproduction terminal device and enjoy it. In the case that acoustic information is to be directly downloaded to the portable information recording and reproduction terminal device via the personal computer 40, the portable information recording and reproduction terminal device can be disconnected from the personal computer 40, and it is possible to reproduce and enjoy the acoustic information while the device is carried.

Figure 10:
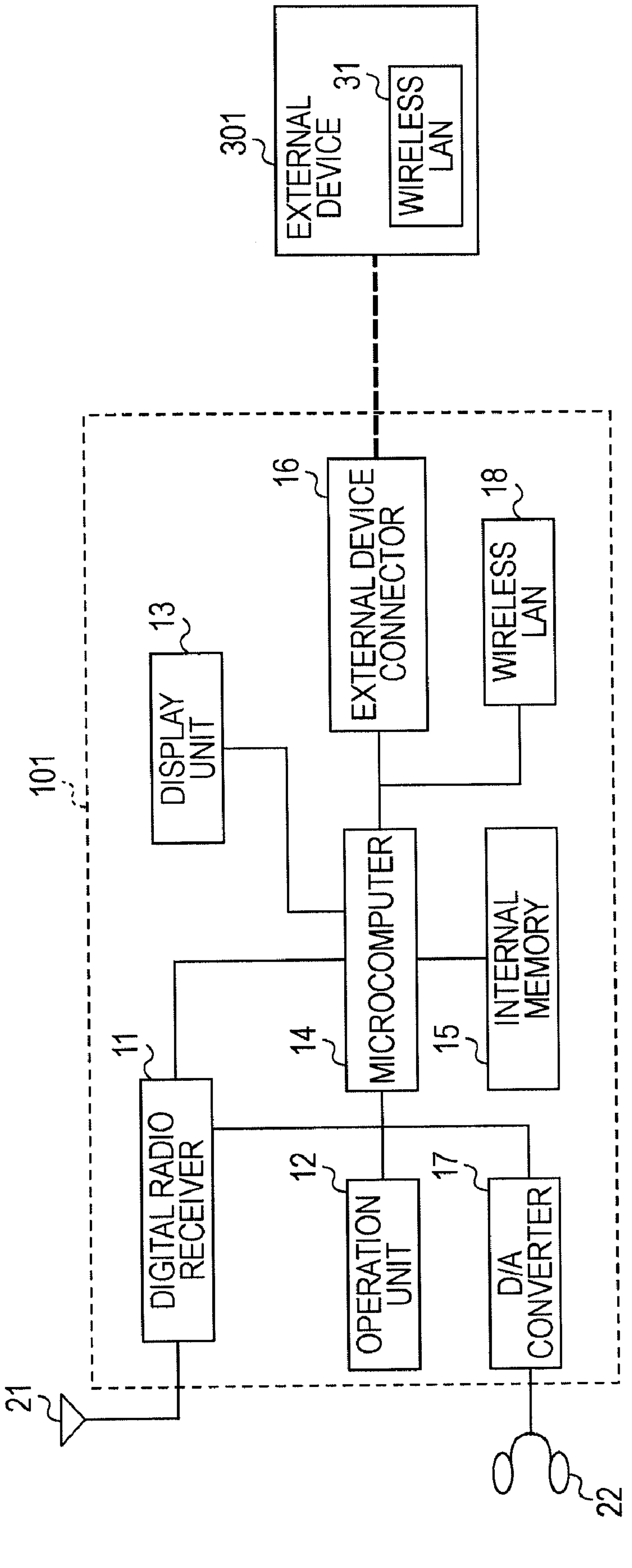
FIG. 10 is a block diagram of another digital radio receiver.

FIG. 10 is a block diagram of a digital radio receiver 101 according to a modification of the embodiment. The digital radio receiver 101 includes, in addition to each unit possessed by the digital radio receiver 10, a wireless LAN 18. Similarly, an external device 301 is also provided with a wireless LAN 31 in correspondence with such a digital radio receiver 101. With such a configuration, even if a configuration not having the external device connector 16 is adopted, it is possible for the digital radio receiver 101 to make communication with the external device 301.

Each time the recording button of the operation unit 12 of the digital radio receiver 101 is pressed, the microcomputer 14 recognizing the pressing detects information on a piece of music sent from the digital radio receiving unit 11, and sends the information on the piece of music to the wireless LAN 31 of the external device 301 via the wireless LAN 18.

The wireless LAN 31 stores information on a piece of music that functions as meta-information (token) with which the target acoustic information can be identified in a non-volatile memory (for example, an EEPROM) of the external device 301. In the manner described above, it is possible to sequentially record information on pieces of music in the external device 301, for example, while listening to music or the like with a headphone 22.

Here, when the size of the meta-information approaches a limit at which it can be stored in the non-volatile memory of the external device 301 or when the limit at which the meta-information can be stored in the non-volatile memory is exceeded, the external device 301 can give a warning to the digital radio receiver 101 so that the external device 301 is mounted in the personal computer 40, the external device 301 is connected to the personal computer 40, the information on those pieces of music is moved, and the available capacity of the non-volatile memory in the external device 301 is increased. This warning may appeal to the sense of hearing as an acoustic signal using sound or the like for the headphone 22 or may appeal to the sense of vision using a liquid-crystal display for the display unit 13, or the like.

Furthermore, a multi-functional product in which one of the digital radio receiver 10 and the digital radio receiver 101 and one of the external device 30 and the external device 301 are combined can also be configured as a digital radio receiver. In this case, the product can be made to be a product that has the functions of either the digital radio receiver 10 or the digital radio receiver 101 and that has the functions of either the external device 30 or the external device 301. The product, as a digital radio receiver, receives a radio broadcast and can also store information on pieces of music and associated information. Thus, the acoustic information that has already been stored can be listened to via the headphone provided in the digital radio receiver.

Furthermore, the external device 301 may be used in place of the external device 30, the personal computer 40 is also provided with a wireless LAN, and communication between them is performed by using radio waves as a medium, thereby making it possible to save connection time and effort.

The external device incorporate a non-volatile memory in the manner described above. The external device may take the form of a portable information recording and reproduction terminal device in which an acoustic information downloading interface device for downloading acoustic information specified by the information on the piece of music via the acoustic information downloading device, an acoustic information recording device for storing the acoustic information, and an acoustic information reproduction apparatus for decoding the stored acoustic information, performing D/A conversion thereon, and enabling the user to listen to an acoustic signal using a headphone or the like in the end are included as one unit.

Furthermore, the external device may be configured as the above-described portable information recording and reproduction terminal device and may also be configured as a digital radio receiver having both the functions possessed by the portable information recording and reproduction terminal device and the functions possessed by the digital radio receiver 10. In this case, it is possible to directly move information regarding a piece of music to the acoustic information downloading device from the digital radio receiver without the intervention of an intermediary, such as the external device 30.

FIGS. 11A and 11B show how information on pieces of music are displayed on the display unit 13. FIG. 11A shows an example of a one-line display shown on the liquid-crystal display provided in the display unit 13. The information on each piece of music recording date and time (e.g., 12/AUG/07), the music title (e.g., AAAAAAAA), the artist name (e.g., BBBBBBB), and the program title (e.g., VVVV) is shown in sequence starting from the left side. FIG. 11B shows an example of a list display shown on the liquid-crystal display provided in the display unit 13. The information on each piece of music regarding the recording date and time (e.g., 12/AUG/07), the music title (e.g., AAAAAAAA), and the artist name (e.g., BBBBBBB), which are information regarding one piece of music, is shown in sequence starting from the left side. In the second line in the vertical direction, The information on each piece of music regarding the recording date and time (e.g., 10/AUG/07), the music title (e.g., CCCCCCCC), the artist name (e.g., DDDDDDD), and the program title (e.g., VVVV), which are information regarding another piece of music, is shown. Similarly, in the third line, the information on each piece of music regarding the recording date and time (e.g., 20/JUL/07), the music title (e.g., EEEEEEEE), the artist name (e.g., FFFFFFF), and the program title (e.g., VVVV) is shown. Similarly, in the fourth line, the information on each piece of music regarding the recording date and time (e.g., 15/JUL/07), the music title (e.g., GGGGGGGG), the artist name (e.g., HHHHHHH), and the program title (e.g., VVVV) is shown. Similarly, in the fifth line, the information on each piece of music regarding the recording date and time (e.g., 15/JUL/07), the music title (e.g., IIIIIII), the artist name (e.g., JJJJJJJ), and the program title (e.g., VVVV) is shown.

On the basis of the information displayed on the display unit, it is possible for the user to obtain information on a piece of music only on the basis of the information displayed on the display unit by not listening to acoustic information, therefore, by using a digital radio receiver that does not have the headphone 22 and the D/A converter 17. Then, it is possible to obtain desired acoustic information from the information on the piece of music in an ex-post manner. The specific method of obtaining information on a piece of music is the same as the first to third embodiments. When the user operates the recording button in the first to third embodiments, it is possible to know the timing at which the user presses the recording button on the basis of the sense of vision information displayed on the display unit 13 rather than the sense of hearing information (acoustic signal) from the headphone 22. Here, as described above, in the case that a time offset between acoustic information and information on a piece of music, and the above-described fade-in and fade-out effects are involved, the case in which the acoustic information and the information on the piece of music do not match with each other over three or more items of information can easily occur. Therefore, it is preferable that the number of memories in which information on pieces of music (including program information) are stored be 3 or more.

It should be understood by those skilled in the art that various modifications, combinations, sub-combinations and alterations may occur depending on design requirements and other factors insofar as they are within the scope of the appended claims or the equivalents thereof.

What is claimed is:

1. A digital radio receiver for receiving information on a piece of music that is identification information for specifying content of digital acoustic information, the identification information being broadcast together with the digital acoustic information, the digital radio receiver comprising:

an internal memory configured to store the information on the piece of music;

an operation unit configured to set a timing at which a flag that includes at least one value indicating that a deletion of the information on the piece of music is prohibited is attached to the information on the piece of music recorded in the internal memory; and a controller configured to perform a process for storing the information on the piece of music in the internal memory.

2. The digital radio receiver according to claim 1, wherein the number of pieces of information on pieces of music stored in the internal memory is three or more.

3. The digital radio receiver according to claim 1, wherein the controller performs control for detecting program information that is information for specifying a program to be broadcast and deleting, each time the program information is updated, the information on the piece of music stored before the update from the internal memory.

4. The digital radio receiver according to claim 3, wherein, when a flag is attached to the information on the piece of music, the controller performs control so that the information on the piece of music is not deleted.

5. The digital radio receiver according to claim 1, wherein information on different pieces of music that is obtained from when the power supply of the digital radio receiver is switched on until the operation unit sets a timing at which a flag is attached to the information on the piece of music is stored in the internal memory.

6. The digital radio receiver according to claim 1, wherein the maximum number of pieces of information on pieces of music to be stored in the internal memory is set using the operation unit.

7. A digital radio receiver for receiving information on a piece of music that is identification information for specifying content of digital acoustic information, the identification information being broadcast together with the digital acoustic information, the digital radio receiver comprising:

an internal memory configured to store the information on the piece of music;

an operation unit configured to set a timing at which a flag is attached to the information on the piece of music recorded in the internal memory;

a controller configured to perform a process for storing the information on the piece of music in the internal memory; and a wireless local area network connecting unit through which information on the information on pieces of music stored in the internal memory is sent to an external device, the digital radio receiver being connected to the external device via radio waves.

* * * * *